United States Patent

[11] 3,561,795

| | | |
|---|---|---|
| [72] | Inventor | Udo Becher<br>Leipzig, Germany |
| [21] | Appl. No. | 721,232 |
| [22] | Filed | Apr. 15, 1968 |
| [45] | Patented | Feb. 9, 1971 |
| [73] | Assignee | VEB Montagewerk Leipzig<br>Leipzig, Germany |

[54] PIPE CONNECTIONS
5 Claims, 6 Drawing Figs.

[52] U.S. Cl................................................. 285/55,
285/292; 264/263
[51] Int. Cl...................................................... F16l 13/10,
F16l 47/00
[50] Field of Search.............................. 285/(Mastic Digest),
292, 423, 109, 398,
R(Digest), F.C.(Digest); 285/292, 55

[56] References Cited
UNITED STATES PATENTS

| | | | |
|---|---|---|---|
| 3,252,192 | 5/1966 | Smith............................ | 285/(Mastic) |
| 3,276,792 | 10/1966 | Dunton......................... | 285/55X |
| 3,325,195 | 6/1967 | Margis........................... | 285/(Mastic) |
| 3,387,864 | 6/1968 | Walters......................... | 285/(Mastic) |
| 3,388,932 | 6/1968 | Bradley......................... | 285/423X |
| 3,402,731 | 9/1968 | Martin........................... | 285/423X |

*Primary Examiner*—Thomas F. Callaghan
*Attorney*—Tab T. Thein

ABSTRACT: Pipe connection for joining two pipes having two concentric pairs of half shells around the joint ends of the two pipes to be connected, the inner pair being larger in diameter than the pipes and the outer pair being larger than the inner pair, with large-area bonding interstices therebetween. The gaps between half shells are angularly staggered between the inner and outer pairs. Preferably the gaps are filled up with the same bonding agent used to interconnect the pipes with the pairs of half shells.

INVENTOR
UDO BECHER

BY *Cal Thein*
AGENT

PIPE CONNECTIONS

The invention relates to pipe connections, particularly for pipes lined with plastic material or insulated on the inside, by means of pairs of half shells and optional bonding and/or welding sleeves, the latter preferably in the case of plastic-lined pipes.

In the construction of industrial pipeline processes have been known for a long tine in which metal pipes are joined by welding, by means of flanges, threaded sleeves or threaded pipe unions. Extensively applied is furthermore the joining of plastic tubing by means of bonding sleeves which may be designed as tuck-in sleeves or thrust-over sleeves.

There are also bonding connections of metal pipes which are produced with the aid of miscellaneous types of sleeves or by laminations, i.e. the wrapping around by fabrics soaked with a bonding agent. Pipes insulated on the inside and lined with plastic material are generally connected by means of flanges or threaded unions.

According to known processes such inside-insulated or plastic-lined pipes, when made of metal, are welded, with the butt-joined pipe ends having each a casing of which the constructed neck portion abuts the pipe extremity and is welded thereto, said casing being butt-welded to the casing of the connecting pipe and forming with the latter an annular chamber enclosing the piping and serving to provide heat insulation so that the butt joint of the pipe ends is lodged in the neck portion of one of the casings. Pipes insulated on the inside are also frequently welded together without any sleeves when the welding seam on the inside can subsequently be insulated.

For joining pipes which are lined with bitumen or some plastic material a process became known in which the pipes to be connected are coupled end-to-end by means of a sleeve disposed on one pipe and extending over the end of the other, or by means of a special coupling case which extends over the ends of the two pipes. An interstice is left between the linings of the two pipes, and it is sealed toward the inside by means of a pushed-in auxiliary rubber ring. The thus produced annular hollow space is filled with molten lining material through a fill hole in the sleeve or coupling case. After the bitumen or other substance has cooled down, the fill hole is closed and the auxiliary ring removed.

Through the welding together of metal pipes, high quotients of strength are obtained; however, to produce such results, qualified personnel is required. Through the application of automatic welding equipment and high-performance electrodes the time of completing the operation can be shortened only within certain limits. In the case of piping having greater nominal width in particular, whose welding seam consists of a root seam and a plurality of fill-in and covering seams, the high costs of such a joint have a disadvantageous effect. Moreover, in premises where there is danger of explosions, no welding operations can be performed. To that end the pipeline sections which are to be joined must be transported to a location which is at sufficient distance from the danger zone, this entailing additional expenses. On the other hand, flange connections have the drawback that the operation must proceed with fixed lengths.

The use of prewelded flanges is especially disadvantageous because, in addition to high material consumption, two welding seams for each connection are still required. Owing to the special machining of the pipe ends when threaded sleeves or threaded pipe unions are employed in piping having larger nominal widths, high production costs will be likewise incurred. Known processes of bonded sleeve connections either have the drawback of a low stress resistance or they call for high production costs. Metal-bond connections of the known kind yield the highest stress resistance values when the bonding interstice is within the range of 0.1 millimeter and when the connection is under tensile stress. With increasing dimensions of the bonding interstice the strength of such a connection is greatly reduced.

It is a drawback of such a connection that the small bonding interstice requires sleeve couplings with fitting tolerances which are unattainable in the case of larger pipes.

In lamination processes the disadvantage constitutes the circumstance that high-strength connections cannot be produced at all, or only at great expense. The inconvenient effect of the connection of lined or inside-insulated pipes by means of welding sleeves is that said sleeves, which together with the pipe form an annular chamber for the accommodation of heat insulation, must be welded to the pipe ends before the lining or the inside insulation is applied.

This means that in the assembly of such pipelines at the construction sites, the sleeves must be first welded on the pipe lengths, and the pipe ends which are to be connected must then be relined and/or reinsulated. The process for connecting inside-insulated pipes has the drawback that it is suited for castable lining materials only. Additionally, this process requires the employment of expensive parts.

The invention provides connections which eliminates the indicated drawbacks and which, while offering sufficient stress resistance, are applicable also in instances where hitherto known processes cannot be used for technical reasons, or where they are too costly.

The invention is based on the task or object of developing pipe connections, based on the application of the metal bonding technique, aiming at attaining sufficiently high stress resistances with the largest possible bonding interstices, and a well sealing interconnection between the linings in inside-insulated or lined pipes.

In accordance with one of the major features of the invention, the problem is solved in that the two ends of the pipes to be connected are joined by means of pairs of half shells applied to the outside, superposed and staggered relative to one another, and having limited but large bonding interstices, with the application of a bonding agent, preferably having added thereto fine- and coarse-grained fillers.

As a bonding agent, known synthetic adhesive resins, particularly epoxy resins, are employed which, in addition to fine-grained fillers of slate meal, quartz powder, metal dust, etc., may contain quartz sand, metal grit, etc., with a grain size up to 2 millimeters.

Preferably, the two ends of the bondable and/or weldable plastic linings of the two pipes are joined with a bonding sleeve of adhesive and/or weldable plastic material, which is tucked into the pipe ends to be connected. The sleeve may also be designed as a welding rather than a bonding sleeve.

It has been found advantageous to join the ends of the linings by means of two or three welding beads.

The invention furthermore provides that the ends of the linings are folded tightly about the pipe ends to be connected.

Further objects, features and attendant advantages as well as structural details of the invention will be apparent from the following description when read in conjunction with the accompanying drawings showing several embodiments of the invention, and wherein.

Figure 1:
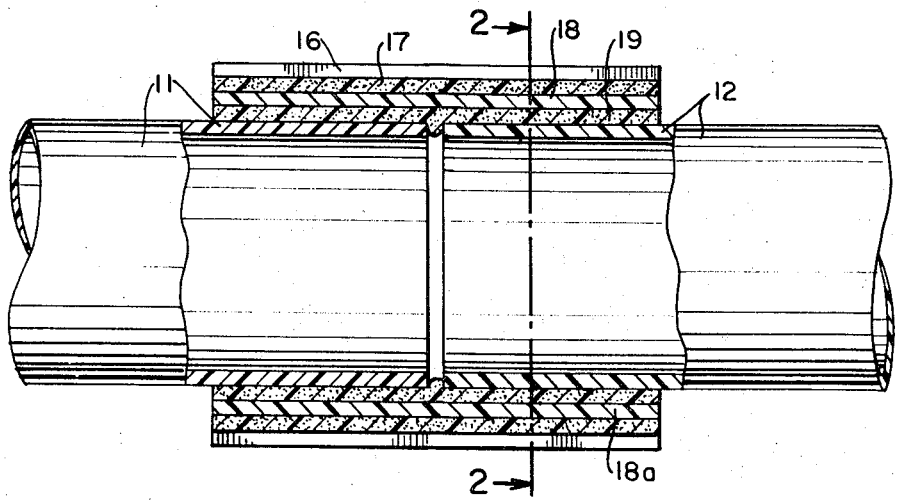
FIG. 1 is a partly sectional elevational view of a preferred first embodiment of the inventive pipe connection.
Figure 2:
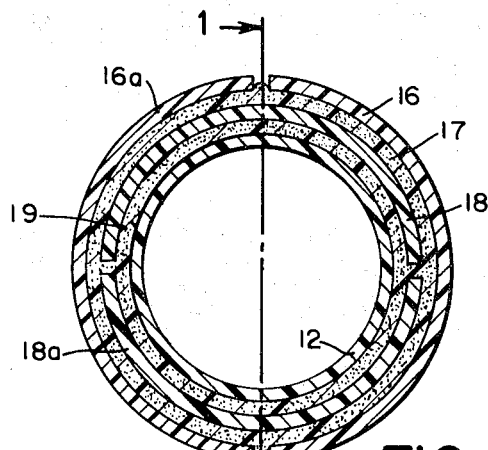
FIG. 2 is a transversal sectional view taken along line 2-2 of FIG. 1 (with line 1-1 indicating the vertical plane in which the sectional portion of FIG. 1 is shown)
Figure 3:
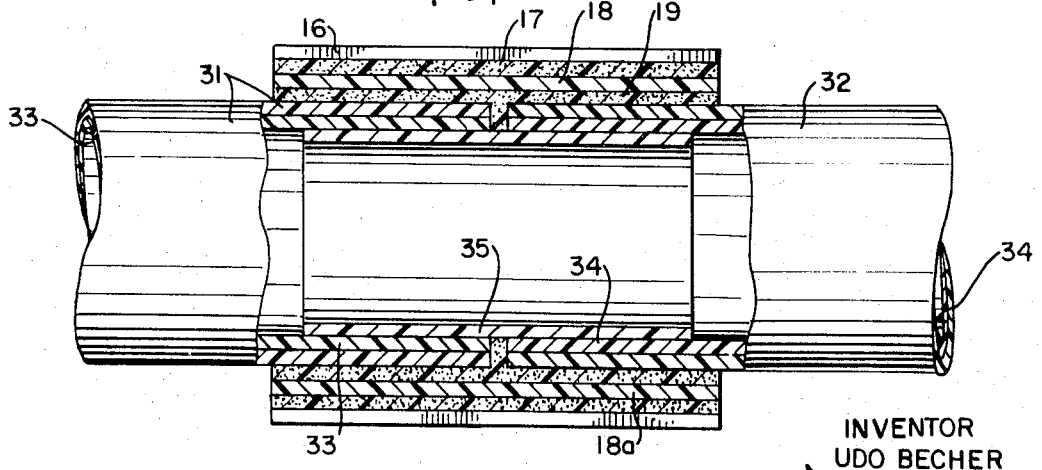
FIG. 3 is a partly sectional view similar to that of FIG. 1, of a second embodiment, for plastic-lined and/or inside insulated pipes, by using an inner bonding sleeve.
Figure 4:
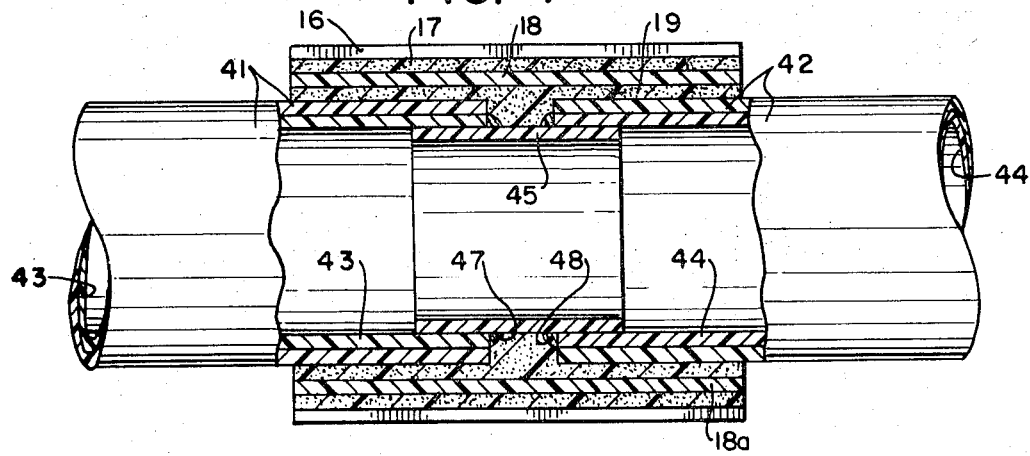
FIG. 4 is the illustration of a third embodiment, also for lined pipes, by using an intimately connected or welded sleeve.
Figure 5:
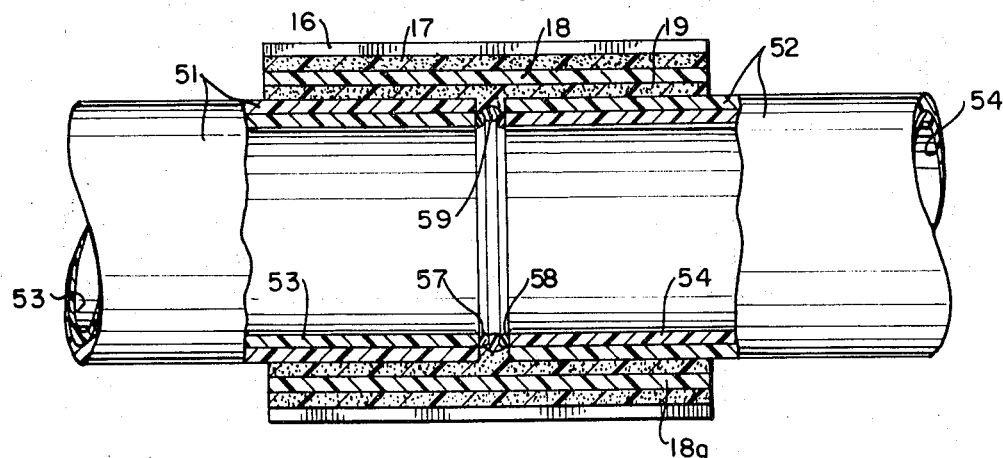
FIG. 5 shows a fourth embodiment, with an intimate connection provided by a composite welding bead.
Figure 6:
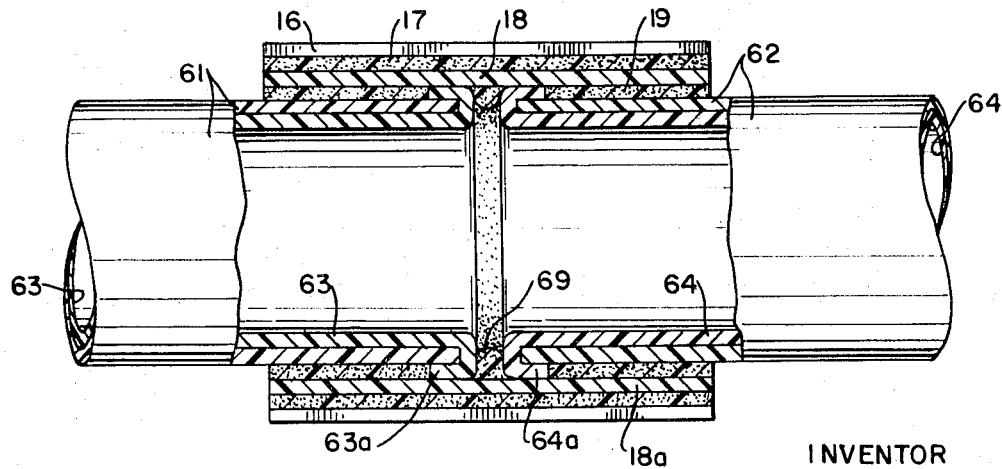
FIG. 6 is again a partly sectional view, similar to those of FIGS. 1, 3, 4 and 5, of a fifth embodiment wherein the terminal portions of the linings are folded around the pipe ends.

Referring to the drawings in general, each of the exemplary embodiments of the inventive pipe connections relates to a pair of pipes, such as shown in FIGS. 1 and 2 at 11 and 12; in FIG. 3 at 31 and 32; and in the subsequent FIGS. 4, 5 and 6 at 41, 42; 51, 52; and 61, 62, respectively. Except the first embodiment, all pipe connections are shown for lined pipes; and consequently, FIGS. 3 through 6 display respective pairs of inner pipe linings 33, 34; 43, 44; 53, 54; and 63, 64.

To produce a pipe connection according to the invention, in any of the exemplary embodiments, it is contemplated to provide an outer pair of half shells 16, 16a (see for example FIG. 2) with a diameter larger than that of the pipes to be connected, and an inner pair of similar half shells 18, 18a having a diameter intermediate to those of the outer shells and the pipes. Respective interstices, 17, 19 are provided, as shown in FIG. 2, preferably filled with an adhesive or bonding agent which also fills the gaps between the half shells in each pair.

It should be noted that one of the half-shell pairs is angularly staggered with respect to the other pair; as a matter of example, a 90° arrangement is shown in FIG. 2.

In making any of the exemplary pipe connections, the pipe ends 11, 12 or 31, 32 are first given a layer of bonding agent 19 onto which are then fitted the half shells 18, 18a. Another coat of the bonding agent follows, as shown at 17, to be completed by the outer half shells 16, 16a. Owing to the large-area interstices 17, 19, no special requirements are made in respect of the dimensional stability of the half-shell pairs 16, 16a and 18, 18a.

Preferably the connection is applied symmetrically over the pipe ends so that half of its length extends over each of them.

To insulate the inner half shells 18, 18a relative to the medium which is to be transported in the pipes, the bonding agent 19 is allowed to enter the gap between the pipe ends.

The bonding agent of interstices 17, 19 preferably consists essentially of an epoxy resin; however any other conventional substance can be used which is suitable for similar pipe sealing and/or interconnecting tasks.

The bonding agent is preferably given a granular filler so as to increase the bond between the pipes and the respective pairs of half shells. The filler is preferably selected from the following suitable materials, all known for their properties for similar purposes: fine-grained slate meal, quartz meal and sand, metal powder and grit, and similar granular substances having a grain size not exceeding 2 millimeters.

FIG. 3, with its second embodiment, shows the connection of the ends of linings 33, 34 inside the pipes 31, 32 by means of a bonding sleeve 35. This sleeve is preferably made from a calibrated plastic tubing in such a way that its outside diameter is slightly larger than the inside width of the linings 33, 34. Owing to its tension and expansion, the sleeve 35 will closely adhere to the inner surface of the linings 33, 34. At the ends of the latter, inside the pipe connection, the sleeve 35 is securely fastened by means of a plastic bonding cement or the like substance. The sleeve is preferably symmetrically disposed within the pipe connection and the pairs of half shells 16, 16a; 18, 18a. The bonding agent securing the sleeve may at least partly fill up the annular gap between the joint ends of the pipes 31, 32.

FIG. 4 illustrates the third embodiment wherein a welding sleeve 45 is applied inside the respective linings 43, 44. Direct connection of the linings is achieved by way of two welding seams 47, 48 between the sleeve 45 and the inner ends of the linings 43, 44. The connection need not necessarily be by way of welding as long as an intimate connection is attained.

The fourth embodiment of FIG. 5 shows a connection between the butt-joined pipes 51, 52 which are lined with the linings 53, 54 made of weldable plastic material. A welding bead 57, 58 is applied to the respective lining ends, and the two beads are then joined by a third welding bead 59. A most intimate connection is thus obtained between the linings and the respective pipe ends around them.

Finally, FIG. 6 shows the fifth exemplary solution to the inventive pipe connections, relative to butt-joined lined and/or inside-insulated pipes 61, 62, the linings being designated by numerals 63, 64, as mentioned before. The illustration clearly shows that the inner ends 63a, 64a of the linings are tightly folded or bent over the inner pipe ends; a length of 1 centimeter is considered adequate for this purpose although a greater length may provide better adherence to the outer surface of the pipes 61, 62.

For making this kind of pipe connection, the linings are made to protrude beyond the pipe ends so as to be adapted to be folded over. In this embodiment as well as in the previously described ones, the bonding agent (e.g. of interstice 17) is best allowed to enter the area between the inner pipe ends. In FIG. 6, a gap 69 is identified which is at least partly filled up with the bonding agent.

It should be understood, of course, that the foregoing disclosure relates only to preferred embodiments of the invention and that it is intended to cover all changes and modifications of the examples described which do not constitute departures from the spirit and scope of the invention as set forth in the appended claims.

I claim:

1. A pipe connection, comprising a pair of plastic-lined and inside-insulated pipes, said pipes being axially separated to provide a gap therebetween, two concentric, substantially coextensive pairs of half shells applied around the joint ends of the two pipes, and large-area bonding interstices between the respective outer and inner surfaces of the two pipes and the inner pair of half shells, on the one hand, and of said pairs of half shells, on the other, gaps provided between said half shells being angularly staggered between said pairs, wherein the two pipes are provided with inner linings, and an inner sleeve having a substantially constant outside diameter throughout its entire length, said outside diameter of the sleeve being slightly larger than the inside diameter of said linings, said sleeve applied within said linings and substantially symmetrical with respect to said pairs of half shells, a bonding agent applied to the respective inner and outer surfaces of said linings and said sleeve and to the inner surfaces of said half shells, said bonding agent at least partly filling up the annular gap between the joint ends of the two pipes.

2. The pipe connection as defined in claim 1, wherein said bonding agent consists substantially of an epoxy resin.

3. The pipe connection as defined in claim 1, further comprising a granular filler added to said bonding agent.

4. The pipe connection as defined in claim 3, wherein said granular filler substantially comprises fine-grained slate meal, quartz meal or sand, with a grain size not exceeding 2 millimeters.

5. The pipe connection as defined in claim 1, further comprising an intimate connection between a substantially central area of said linings, and at least one of the ends of the two pipes and the respective linings.